US009795017B2

(12) United States Patent
Bello et al.

(10) Patent No.: US 9,795,017 B2
(45) Date of Patent: Oct. 17, 2017

(54) SYSTEMS AND METHODS FOR PRE-COMMISSIONING A WIRELESS LIGHTING CONTROL SYSTEM

(71) Applicant: IDEAL Industries, Inc., Sycamore, IL (US)

(72) Inventors: Nolan Bello, North Aurora, IL (US); Sushil N. Keswani, Sycamore, IL (US)

(73) Assignee: IDEAL Industries, Inc., Sycamore, IL (US)

(*) Notice: Subject to any disclaimer, the term of this patent is extended or adjusted under 35 U.S.C. 154(b) by 0 days.

(21) Appl. No.: 15/445,173

(22) Filed: Feb. 28, 2017

(65) Prior Publication Data

US 2017/0171951 A1 Jun. 15, 2017

Related U.S. Application Data

(63) Continuation of application No. 14/794,272, filed on Jul. 8, 2015, now Pat. No. 9,629,227.

(60) Provisional application No. 62/023,557, filed on Jul. 11, 2014.

(51) Int. Cl.
*H05B 37/02* (2006.01)
*H04W 60/00* (2009.01)
*H04W 48/16* (2009.01)
*H05B 33/08* (2006.01)
*H04W 88/16* (2009.01)

(52) U.S. Cl.
CPC ........ *H05B 37/0272* (2013.01); *H04W 48/16* (2013.01); *H04W 60/00* (2013.01); *H05B 33/0842* (2013.01); *H05B 37/0227* (2013.01); *H04W 88/16* (2013.01)

(58) Field of Classification Search
CPC ............ H05B 33/0842; H05B 37/0227; H05B 37/0272
USPC ........................................................ 315/312
See application file for complete search history.

(56) References Cited

U.S. PATENT DOCUMENTS

| 2011/0140864 A1* | 6/2011 | Bucci | G08C 17/02 340/10.42 |
|---|---|---|---|
| 2013/0088168 A1* | 4/2013 | Mohan | G05B 15/02 315/297 |
| 2014/0015415 A1* | 1/2014 | Lim | H05B 37/02 315/131 |
| 2016/0036484 A1* | 2/2016 | Sullivan | H04B 1/40 315/291 |

* cited by examiner

*Primary Examiner* — Tung X Le
(74) *Attorney, Agent, or Firm* — Greenberg Traurig, LLP

(57) ABSTRACT

Systems and methods for pre-commissioning a wireless lighting control system. The method includes the steps of defining a name of a space having a lighting control installed, scanning in at least one wireless lighting component using a mobile application ("mobile app"), scanning in at least one gateway unit using the mobile app, scanning in at least one peripheral control unit using the mobile app, creating associations with the at least one wireless lighting component, the at least one peripheral control unit, and the at least one gateway unit, installing the at least one wireless lighting component, the at least one peripheral control unit, and the at least one gateway unit, uploading a complete list of products in the space to a system web application using the mobile app, uploading the complete list of products in the space to a gateway unit that controls the space using the system web application, and powering on all of the products in the space.

4 Claims, 3 Drawing Sheets

SYSTEMS AND METHODS FOR PRE-COMMISSIONING A WIRELESS LIGHTING CONTROL SYSTEM

CROSS REFERENCE TO RELATED APPLICATION

This application claims the benefit of and is a continuation of U.S. application Ser. No. 14/794,272, filed on Jul. 8, 2015, which application, in turn, claim the benefit of U.S. Provisional Application Ser. No. 62/023,557, filed Jul. 11, 2014, which applications are incorporated herein by reference in their entirety.

FIELD OF THE DISCLOSURE

The present description relates generally to wireless lighting control systems and more particularly to systems and methods for pre-commissioning a wireless lighting control system.

BACKGROUND OF RELATED ART

Wireless lighting control systems, such as a digital addressable lighting interface ("DALI") system, are known in the art. Such systems may include dimming and electrical ballasts as well as sensors (e.g., daylight, occupancy, etc.), manually-operated switches, lighting or other loads, and a central controller, or "gateway," running application software. The gateway typically communicates with devices in the system via bi-directional data exchange. In the known systems, every device in the system with which the gateway is to communicate has to be assigned an address that has to be manually identified to the gateway upon start-up (known as "commissioning"). In the known systems, this typically requires physical manipulation of the devices after they have already been installed. Initial set-up and subsequent modification of such systems can thus be complicated and time consuming.

In view of the foregoing, it would be desirable to be able to provide a method for pre-commissioning a wireless lighting control system before device installation.

DETAILED DESCRIPTION

The following description of example systems and methods is not intended to limit the scope of the description to the precise form or forms detailed herein. Instead the following description is intended to be illustrative so that others may follow its teachings.

Figure 1:
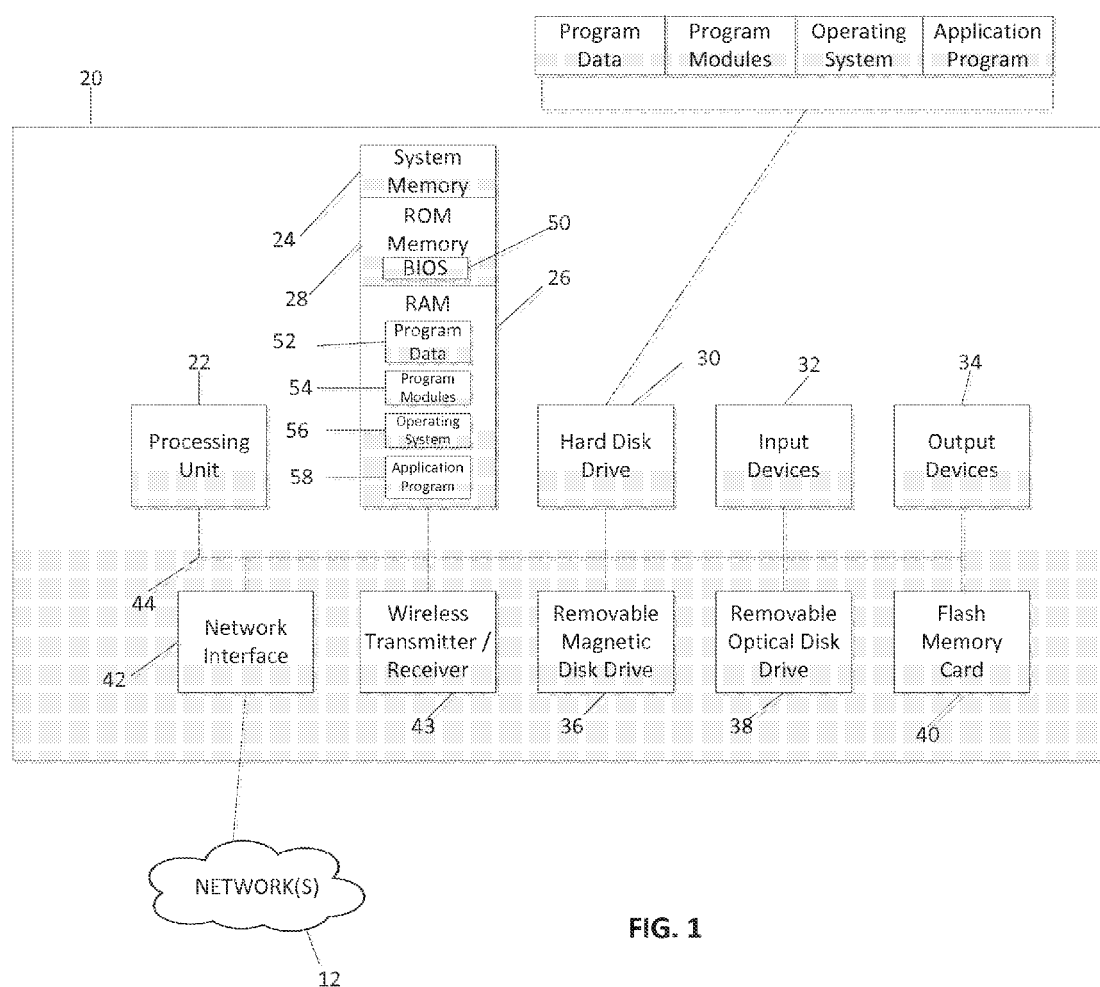
FIG. 1 is a schematic view of an example computer system specifically designed to run an example gateway unit as described herein.

Referring now to FIG. 1, there is shown an example hardware unit configured as an example gateway unit 20 and illustrated in schematic form. The gateway unit 20 may be provided with computer readable executable instructions. Generally, the computer executable instructions reside in program modules which may include routines, programs, objects, components, data structures, etc. that perform particular tasks or implement particular abstract data types. Those of ordinary skill in the art will appreciate that the various tasks described hereinafter may be practiced on a single gateway unit or in a distributed environment having multiple gateway units linked via a network.

For performing various tasks in accordance with the executable instructions, the example gateway unit 20 may include a processing unit 22 and a system memory 24 which may be linked via a bus 44. Without limitation, the bus 44 may be a memory bus, a peripheral bus, and/or a local bus using any of a variety of bus architectures. The processing unit 22 may be any type of processing unit for executing software instructions, but will conventionally be a microprocessor device. As needed for any particular purpose, the system memory 24 may include a read only memory ("ROM") 28 and/or a random access memory ("RAM") 26. As will be appreciated by those of ordinary skill in the art, both the ROM 28 and the RAM 26 may store executable instructions to be executed by the processing unit 22.

The processing unit 22 and the system memory 24 may also be connected, either directly or indirectly, through a bus 44 or alternate communication structure to one or more peripheral devices. For example, the processing unit 22 or the system memory 24 may be directly or indirectly connected to additional memory storage, such as a hard disk drive 30, a removable optical disk drive 38, a removable magnetic disk drive 36, and/or a flash memory card 40. The drive interfaces and their associated computer-readable media allow for the non-volatile storage of computer readable instructions, data structures, program modules, and other data for the gateway unit 20. Those of ordinary skill in the art will further appreciate that other types of non-transitory computer-readable media that can store data and/or instructions may be used for this same purpose.

A number of program modules may be stored in one or more of the memory/media devices. For example, a basic input/output system ("BIOS") 50, containing the basic routines that help to transfer information between elements within the gateway unit 20, such as during start-up, may be stored in the ROM 28. Similarly, the RAM 26, the hard drive 30, and/or the peripheral memory devices may be used to store computer executable instructions comprising an operating system 56, one or more application programs 58 (such as a browser, lighting system controller, etc.), other program modules 54, and/or program data 52. Still further, computer-executable instructions may be downloaded to one or more of the memory devices as needed, for example via a network connection.

The processing unit 22 and the system memory 24 may also be directly or indirectly connected to one or more input devices 32 and/or one or more output devices 34. The input devices 32 may include a keyboard, touch screen, a point device (e.g. a mouse or touchpad), RFID detector, PIN pad, or any other suitable device. The input devices 32 may be connected to the processing unit 22 using interfaces such as, for example, a parallel port, game port, firewire, or a universal serial bus ("USB"). The output devices 34 may include, for example, a monitor display, an integrated display, a television, and/or any other suitable device.

The processing unit 22 may be directly or indirectly connected to one or more network interfaces 42 for communicating with a network 12. The example network interface 42, also sometimes referred to as a network adapter or network interface card ("NIC"), translates data and control signals from the processing unit 22 into network messages according to one or more communication protocols, such as the Transmission Control Protocol ("TCP"), the Internet Protocol ("IP"), the Building Automation and Control Networks ("BACnet") protocol, the Modbus protocol, the Local Operating Network ("LonWorks") protocol, and the User Datagram Protocol ("UDP"). These protocols are well known in the art. The network interface 42 may employ any suitable connection agent for connecting to the network 12, including, for example, a wireless transceiver, a power line adapter, a modem, or an Ethernet connection.

The processing unit 22 may also be directly or indirectly connected to a wireless transmitter/receiver 43 for wirelessly communicating with wireless lighting devices (not shown) including, for example, a light sensor, a motion sensor, a smart switch, a smart connector, a smart motor, and/or a peripheral control unit. One having ordinary skill in the art will appreciate that the wireless transmitter/receiver 43 may use any appropriate wireless communications technique, including radio frequencies, optical, infrared, ultrasonic, or the like.

It should be appreciated by one having ordinary skill in the art that a gateway unit employed according to the various examples of the present disclosure may include more components than the gateway unit 20 illustrated in FIG. 1, fewer components than the gateway unit 20, or a different combination of components than the gateway unit 20 as desired.

Figure 2:
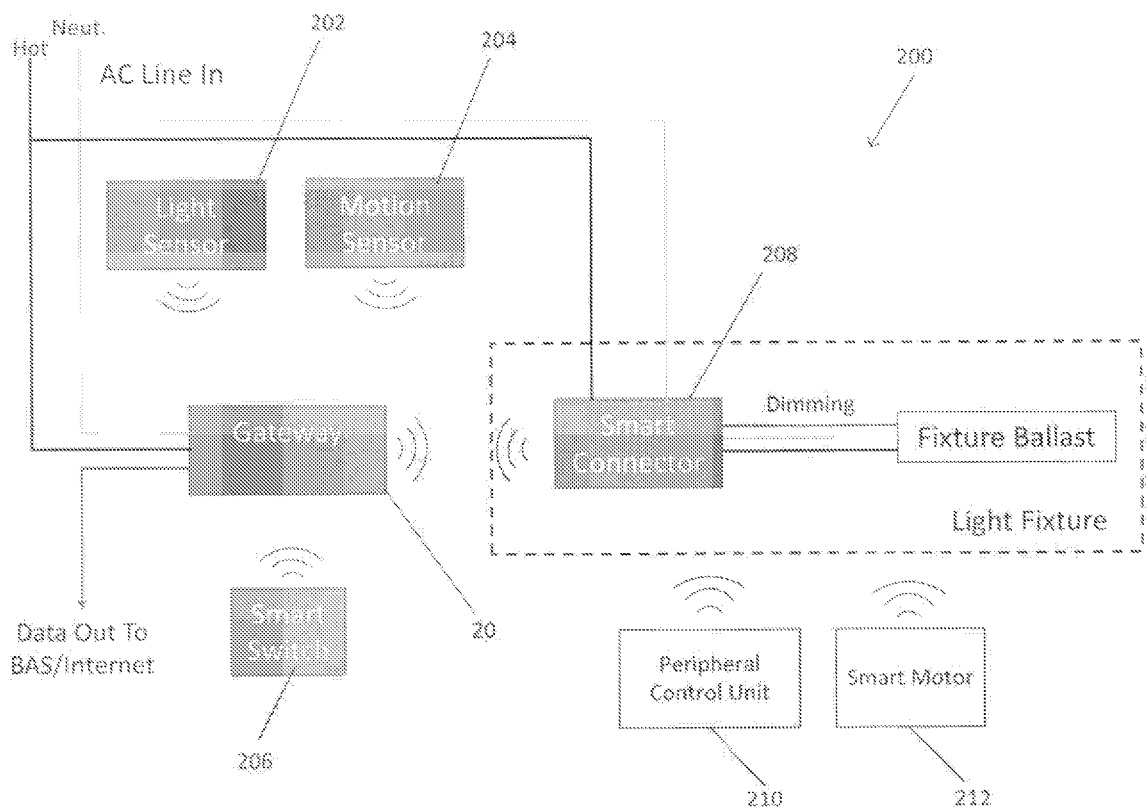
FIG. 2 is a schematic view of an example system incorporating the example gateway unit of FIG. 1.

Referring now to FIG. 2, a wireless lighting control system 200 is provided for wirelessly controlling one or more wireless lighting devices in a space. The space may be, for example, an individual room or office, a classroom, a manufacturing area, a lobby, and/or other defined area. The space may include one or more wireless lighting devices such as, for example, a light sensor 202, a motion sensor 204, a smart switch 206, a smart connector 208, a smart motor 212 and/or a peripheral control unit 210. The wireless lighting devices in the space may communicate back and forth with and/or be controlled by the gateway unit 20. The system 200 can also be wirelessly connected between spaces and be centrally, but not exclusively, controlled via Web-based (i.e., World Wide Web-based) lighting control software executing on a computing device, such as a host computer or a mobile device.

Figure 3:
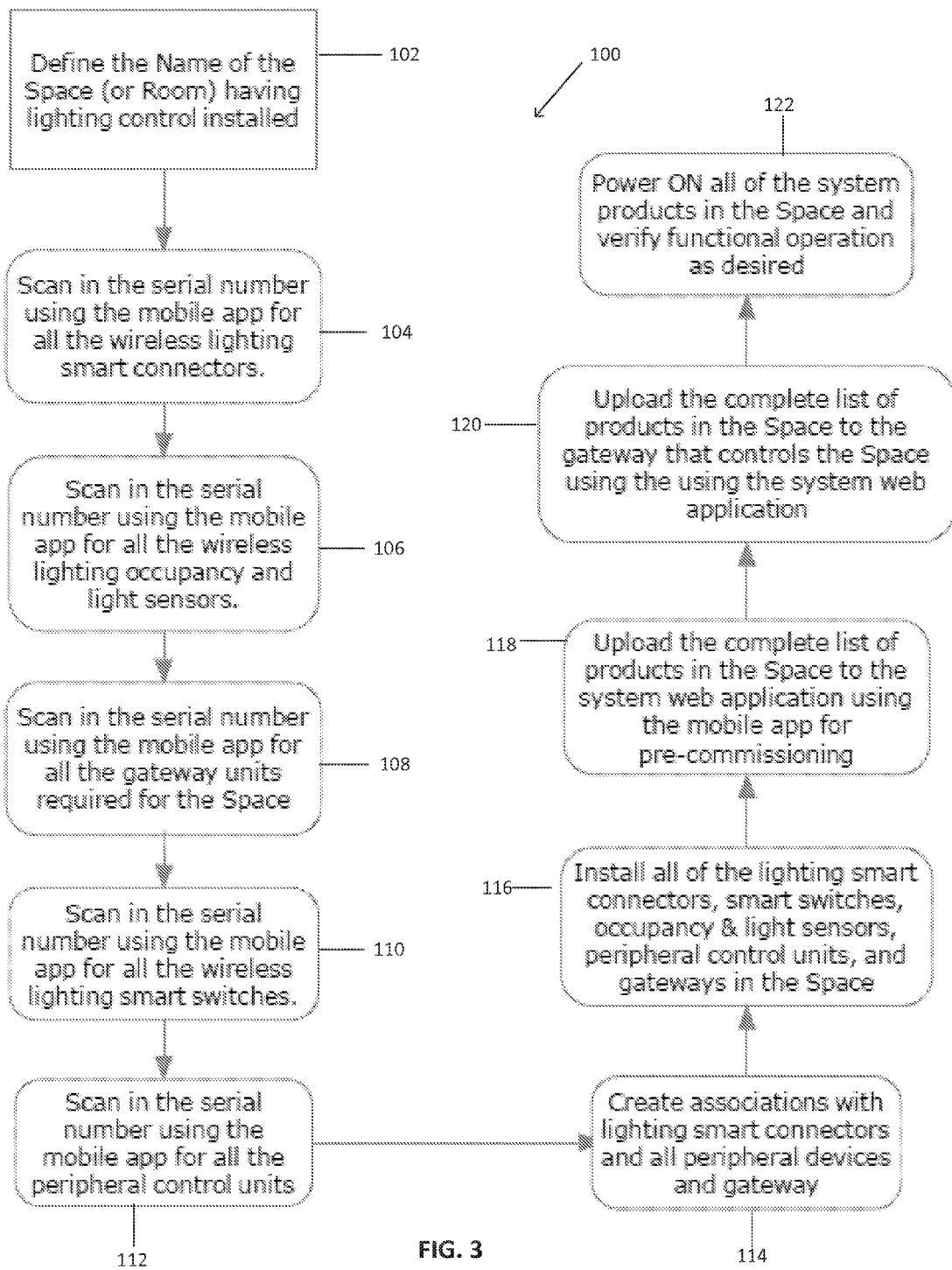
FIG. 3 is a flowchart of an example method for pre-commissioning a wireless lighting control system, as described herein.

Referring now to FIG. 3, there is illustrated a flow chart of one example process 100 for pre-commissioning a wireless lighting control system. In the illustrated example, the process is entered at a block 102 where a user defines, or the process 100 automatically assigns, a name of a space (or room) having a lighting control installed.

Once the name of the space is defined, the process proceeds to a block 104 where the user scans in, using a mobile application (a "mobile app"), a scanner, or other communication device (such as a near field communication ("NFC") device, an RFID reader, etc.) a serial number for all wireless lighting smart connectors. The process then proceeds to a block 106 where the user further scans in, using the mobile app, the scanner, or the other communication device, a serial number for all wireless lighting occupancy and light sensors. The process then proceeds to a block 108 where the user scans in, using the mobile app, the scanner, or the other communication device a serial number for all gateway units required for the space. The process then proceeds to a block 110 where the user scans in, using the mobile app, the scanner, or the other communication device, a serial number for all wireless lighting smart switches. The process then proceeds to a block 112 where the user scans in, using the mobile app, a serial number for all peripheral control units. It will be appreciated by one of ordinary skill in the art that the scanning process may be accomplished utilizing any suitable scanning and/or identification device or method as desired.

During scanning, the device (i.e. the light sensor, the motion, the smart switch, the smart connector, the peripheral control unit, etc.) is registered with the gateway unit 20. Each device serial number contains or is otherwise associated with a device ID that may include, for example, an address and a device type. The device ID, the address, and the device type are stored in a registration database that may be included in or accessed by the gateway unit 20. Once the device ID, the address, and the device type are stored in the registration database, the system 200 can communicate with and receive data from the device. One having ordinary skill in the art will appreciate that the mobile app, the scanner, or the other communication device may need to perform a look-up of the address and the device type (by accessing the Internet, for example), or the mobile app, the scanner, or the other communication device may already have the address and the device type stored or otherwise known.

Next, the process proceeds to a block 114 for creating associations with the wireless lighting smart connectors and all the peripheral control units and the gateway units. The creating associations step may comprise, for example, providing access to the registration database to allow the components to determine or identify the other registered components. The process then proceeds to a block 116 for installing all of the wireless lighting smart connectors, the wireless lighting smart switches, the wireless lighting occupancy and light sensors, the peripheral control units, and the gateway units in the space. Installing is the physical process of mounting, adjusting, hardwiring (i.e. for electrical power, etc.), connecting, etc. all of the components to their final, installed positions in the space.

The process then proceeds to a block 118 for uploading a complete list of products in the space to a system web application using the mobile app. Next, the process proceeds to a block 120 for uploading the complete list of products in the space to a gateway that controls the space using the system web application.

The process ends at a block 122 where the user powers on all of the products in the space and verifies operation as desired. The user may verify operation of the products in the space by, for example, individually testing each product, running testing software installed on the gateway unit 20, or any other suitable method as desired.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A wireless lighting control system comprising:
   at least one peripheral control unit containing a first serial number;
   at least one wireless lighting component containing a second serial number;
   at least one gateway unit containing a third serial number;
   a mobile device; and
   a registration system comprising a scanner for scanning in the first, second and third serial numbers, and a registration database,
   wherein, in response to a user request to initiate a registration, the registration system receives the first, second and third serial numbers, registers the first, second and third serial numbers in the registration database, and provides the at least one peripheral control unit, the at least one wireless lighting component, and the at least one gateway unit access to the registration database to allow the at least one peripheral control unit, the at least one wireless lighting component, and the at least one gateway unit to determine other components registered with the registration database; and wherein, in response to the user scanning in the first, second and third serial numbers, the mobile application receives the first, second and third serial numbers, registers the first, second and third serial numbers in the registration database, and uploads contents of the registration database to a system web application using a network connection.

2. The wireless lighting control system as recited in claim 1, wherein in response to the user request to initiate a registration, the registration system provides the mobile device with access to the registration database.

3. A wireless lighting control system comprising:
 at least one peripheral control unit containing a first serial number;
 at least one wireless lighting component containing a second serial number;
 at least one gateway unit containing a third serial number;
 a mobile device; and
 a registration system comprising a scanner for scanning in the first, second and third serial numbers, and a registration database, wherein, in response to a user request to initiate a registration, the registration system receives the first, second and third serial numbers, registers the first, second and third serial numbers in the registration database, and provides the at least one peripheral control unit, the at least one wireless lighting component, and the at least one gateway unit access to the registration database to allow the at least one peripheral control unit, the at least one wireless lighting component, and the at least one gateway unit to determine other components registered with the registration database; and wherein, in response to the user request to initiate a registration, the system web application accesses the registration database, and uploads contents of the registration database to the at least one gateway unit using a network connection.

4. The wireless lighting control system as recited in claim 3, wherein in response to the user request to initiate a registration, the registration system provides the mobile device with access to the registration database.

\* \* \* \* \*